Patented Jan. 18, 1949

2,459,397

UNITED STATES PATENT OFFICE 2,459,397

AMINO ALIPHATIC GUANAMINES

Jack Theo Thurston, Cos Cob, Conn., assignor to American Cyanamid Company, New York, N. Y., a corporation of Maine No Drawing. Application August 30, 1941,
Serial No. 409,154

6 Claims. (Cl. 260—249.5)

This invention relates to aminoaliphatic guanamines.

A few guanamines have been described in which the 2 carbon atom of the 4,6-diamino-1,3,5-triazine ring carries an alkyl substituent such as a methyl group. According to the present invention 2-substituted guanamines are prepared in which the substituent on the 2 carbon atom of the triazine ring is an aminoaliphatic radical. They may be represented by the following formula:

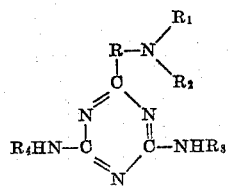

in which R is an acyclic radical united to the 2 carbon atom of the triazine ring by a carbon to carbon bond, $R_1$ and $R_2$ are radicals included in the group consisting of hydrogen, alkyl, aryl, aralkyl, heterocyclic, acyl, or sulfonyl and portions of a cyclic ring, and $R_3$ and $R_4$ are hydrogen, alkyl, aryl, cycloaliphatic or heterocyclic.

The guanamines of the present invention are useful as intermediates for resins of the amino plastic type and permit the production of resins useful in textile finishes, coating compositions, paper sizing, ion exchange and the like.

The present invention is not limited to any particular method of making the guanamines, but I prefer to use a process in which an amino acid ester or acylated amino acid ester is condensed with a biguanide. In many cases the reaction proceeds smoothly without any condensing agent, but in some cases it is desirable to use a strongly basic condensing agent such as a metal alkoxide, for example, sodium methoxide, aluminum isopropoxide and the like.

Among the most useful guanamines which can be prepared according to the present invention are those in which the 2 amino groups of the guanamine nucleus are unsubstituted. These may be produced by reaction with unsubstituted biguanide. However, N-substituted guanamines may be prepared in which the reaction takes place with a corresponding N-substituted biguanide. These products although sometimes more expensive, have the additional advantage that when the substituents are aliphatic groups the resins produced therefrom have adequate solubility in nonpolar organic solvents even when the substituent on the 2 carbon atom does not have a long aliphatic chain.

The invention will be described in greater detail in conjunction with the following examples which are typical illustrations and do not limit the scope of the present invention. It was also noted that in many cases the initial product which separated from the reaction mixture melted at a comparatively low temperature and after digestion with a solvent the product was practically quantitatively converted into a higher melting crystalline form. The parts are by weight.

EXAMPLE 1

*Aminoacetoguanamine*

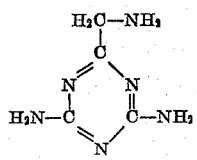

To a solution of 70 parts of glycine ethyl ester hydrochloride in 160 parts of methanol was added a solution containing 32.4 parts of sodium methylate in 160 parts of methanol. After filtration of the sodium chloride a solution of 60.5 parts of biguanide in 140 parts of methanol was added and within a few minutes the guanamine separated from solution. After the reaction was completed the product was filtered from the reaction mixture and washed with a small quantity of methanol. The yield of guanamine, decomposing at 257–258° C. was 61.5%. Crystallization from water gave colorless plates, decomposing at 258–259° C.

EXAMPLE 2

*β-Piperidylpropionoguanamine*

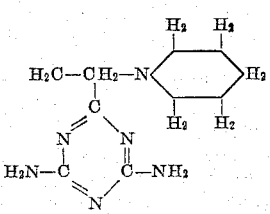

Forty parts of ethyl β-piperidylpropionate, prepared by the addition of piperidine to acrylonitrile, followed by hydrolysis and esterification with alcoholic hydrogen chloride, were added to a solution of 30.3 parts of biguanide in 120 parts of methanol. Within three minutes the contents of the flask had set to a solid, colorless cake. After four hours the cake was broken up and the solid filtered, giving an 89.6% yield of product which decomposed at 223–224°. After crystallization from hot water, slender, silky needles decomposing at 225.5–226.5° were obtained.

EXAMPLE 3

*β-Benzylaminopropionoguanamine*

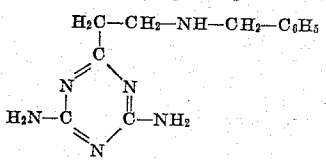

A solution containing 19 parts of ethyl β-benzylaminopropionate prepared from benzylamine and acrylonitrile as described in Example 2, in 40 parts of methanol was mixed with a solution of 10.1 parts of biguanide in 60 parts of methanol. Within a short time the flask contained a colorless cake which after standing four hours was filtered, washed with methanol, and allowed to dry. The yield of crude product melting at 111–113° C. was 90%. After digestion in boiling water and crystallization from this solvent, colorless plates, decomposing at 209–210° were obtained.

EXAMPLE 4

*β-allylaminopropionoguanamine*

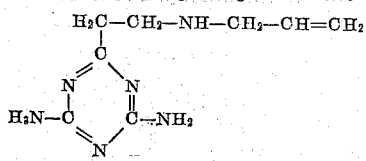

To a solution of 10.1 parts of biguanide in 40 parts of methanol was added a solution containing 10 parts of crude ethyl β-allylaminopropionate, prepared as in Example 2 from allylamine and acrylonitrile, in 20 parts of methanol. After standing one day solid had not appeared so a solution of 3.48 parts of sodium methylate in 20 parts of methanol was added. The following day the solid was filtered and crystallized from a 50–50 water-Cellosolve mixture. The colorless plates decomposed at 229–230°. The yield was inferior to that obtained in Example 3.

EXAMPLE 5

*β-N-acetyl-n-butylaminopropionoguanamine*

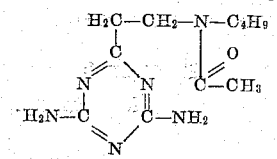

Twenty parts of ethyl β-N-acetyl-n-butylaminopropionate, prepared by the addition of n-butylamine to acrylonitrile followed by acetylation and conversion into the ester as described in Example 2, were poured into a solution containing 10.1 parts of biguanide in 64 parts of methanol. Colorless solid separated within a short time. After standing a day the guanamine was filtered, giving an 81.2% yield of product, decomposing at 221–222°. Crystallization from water produced glittering plates which decomposed at 222–223°.

EXAMPLE 6

*N-Phenylbenzylaminoacetoguanamine*

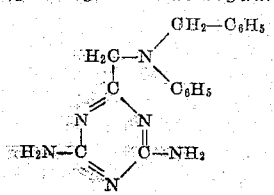

To a solution of 25.2 parts of biguanide in 200 parts of methanol was added 53.46 parts of the n-butyl ester of N-phenylbenzylaminoacetic acid, prepared by reacting n-butyl chloroacetate with benzylaniline. After three and a half hours solid commenced to separate and the next day the material was filtered, washed with methanol and allowed to dry. The methanol filtrate yielded additional solid after evaporation, followed by dissolving in dilute sulfuric acid and precipitation with alkali. The total crude yield of product, melting point 102–106°, was 61%. Digestion and crystallization from methanol produced colorless plates melting at 188–189°.

EXAMPLE 7

*β-Octadecylaminopropionoguanamine*

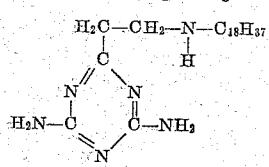

A solution containing 8.85 parts of sodium ethylate in 80 parts of ethanol was mixed with a solution of 42.65 parts of ethyl β-octadecylaminopropionate hydrochloride, prepared by addition of octadecylamine to acrylonitrile as described in Example 2, in 100 parts of ethanol. After filtration of the sodium chloride, a solution of 12.1 parts of biguanide in 60 parts of methanol was added. Half an hour later solid separated from solution. The guanamine was filtered the following day and after crystallization from methanol, colorless plates melting at 120–122° were obtained. The yield was slightly lower than that obtained in Example 6.

EXAMPLE 8

*β-n-Butylaminopropionoguanamine*

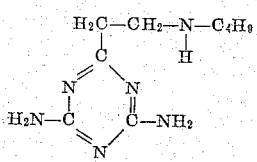

Seventy-one parts of sodium ethylate in 200 parts of ethanol were poured into a solution of 209.5 parts of ethyl β-n-butylaminopropionate hydrochloride, prepared by the addition of n-butylamine to acrylonitrile as described in Example 2, in 200 parts of ethanol. Following filtration of the salt, a solution of 111.1 parts of biguanide in 280 parts of methanol was added. After standing a day the solid was filtered and washed with methanol. Concentration of the filtrate yielded additional product. A crude yield of 73.5% of colorless solid, melting point 98–100° was obtained. After digestion with boiling water, followed by crystallization from Cellosolve, the colorless plates decomposed at 211–212°.

EXAMPLE 9

*ε-Benzoylaminohexanoguanamine*

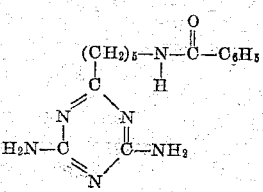

A solution of 25 parts of ethyl ε-benzoylamino-caproate, formed by esterification of ε-benzoylaminocaproic acid as prepared in Org. Syn. 19, 20 (1939) in 50 parts of ethanol was added to a solution of 10.1 parts of biguanide in 40 parts of methanol. The next day the product was filtered, washed with a small quantity of methanol, and allowed to dry. The crude yield was 78% and after crystallization from a 50-50 water-Cellosolve mixture the colorless plates decomposed at about 230°.

EXAMPLE 10

*Stearoylaminoacetoguanamine*

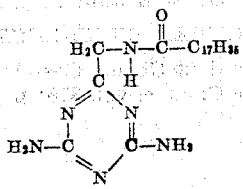

To a suspension of 28 parts of aminoacetoguanamine in 200 parts of pyridine, cooled to 10° was gradually added, with shaking, a solution of 68 parts of stearyl chloride in 50 parts of dioxane. The addition was regulated so that the temperature did not exceed 20°. After all of the acyl chloride was added, the brown, pasty mass was allowed to stand at room temperature for five hours and was then refluxed for 0.5 hour. The mixture was poured into a large volume of ice water, filtered, washed well with water and allowed to dry. The crude yield of light tan solid was quantitative. The material had no definite melting point but commenced to soften at 120° and melted to a brown liquid at 165° C.

EXAMPLE 11

*β-N-Caprylbenzylaminopropionoguanamine*

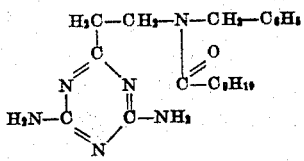

The procedure followed was similar to that of Example 9 except that 12.2 parts of β-benzylaminopropionoguanamine in 100 parts of pyridine was treated with 11.5 parts of capryl chloride in 50 parts of dioxane. After working up the reaction mixture and crystallizing from methanol, colorless solid melting at 147-149° was obtained. The yield was inferior to that obtained in Example 10.

EXAMPLE 12

*Benzenesulfonylaminoacetoguanamine*

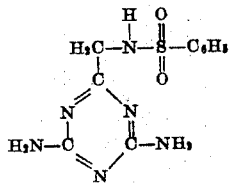

A similar procedure as given in Example 10 was followed. Seven parts of aminoacetoguanamine in 200 parts of pyridine were treated with 9 parts of benzenesulfonyl chloride. After working up the reaction mixture and crystallizing from water, tan plates decomposing at 212-213° were obtained.

EXAMPLE 13

*β-N-acetyl-n-butylaminopropionoguanamine*

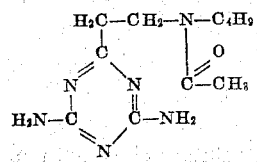

A mixture of 10 parts of β-n-butylaminopropionoguanamine and 25 parts of acetic anhydride was placed in a flask and heated over a free flame. Within a short time complete solution occurred and the boiling solution was cooled in an ice bath. A slimy solid separated which gave a clear solution on addition of water. The clear solution of the acetate salt was made alkaline with sodium hydroxide solution. The colorless solid which precipitated was filtered, washed well with water, and recrystallized from hot water. Glittering colorless plates, decomposing at 221-222° were obtained which gave a marked depression in melting point when fused with a portion of starting material but which melted at the same temperature when sintered with the sample previously prepared in Example 5.

I claim:

1. Aminoaliphatic guanamines having the following formula:

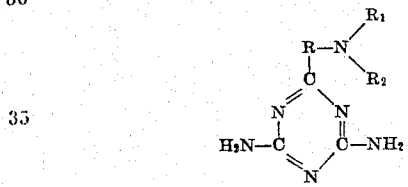

in which R is an acyclic radical united to the 2 carbon atom of the triazine ring by a carbon to carbon bond and $R_1$ and $R_2$ are radicals included in the group consisting of hydrogen, alkyl, aryl, aralkyl, acyl, sulfonyl and a portion of a saturated heterocyclic ring.

2. Aminoaliphatic guanamines having the following formula:

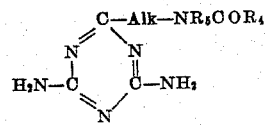

in which Alk is alkyl, $R_4$ is an aliphatic hydrocarbon radical, and $R_5$ is a member included in the group consisting of hydrogen, alkyl, aryl and aralkyl.

3. Aminoaliphatic guanamines having the following formula:

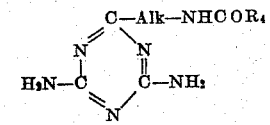

in which Alk is alkyl and $R_4$ is an aliphatic hydrocarbon radical.

4. Stearoylaminoacetoguanamine having the following formula:

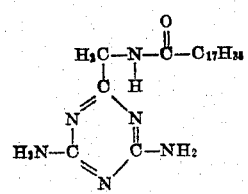

5. Octadecylaminopropionoguanamine having the following formula:

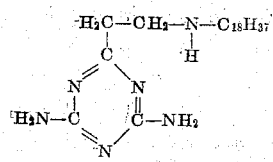

6. β-butylaminopropionoguanamine having the following formula:

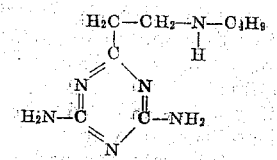

JACK THEO THURSTON.

REFERENCES CITED

The following references are of record in the file of this patent:

UNITED STATES PATENTS

| Number | Name | Date |
| --- | --- | --- |
| 2,165,267 | Hubert | July 11, 1939 |
| 2,192,127 | Ebel | Feb. 27, 1940 |
| 2,228,161 | Zerweck | Jan. 7, 1941 |

FOREIGN PATENTS

| Number | Country | Date |
| --- | --- | --- |
| 106,398 | Switzerland | 1924 |
| 466,096 | Great Britain | 1937 |
| 486,577 | Great Britain | 1938 |

OTHER REFERENCES

Berichte de deut Chem., Gessel, vol. 25, p. 540.
Annalen de Chemie, vol. 376; p. 167.